United States Patent [19]

Holley

[11] Patent Number: 4,881,887

[45] Date of Patent: Nov. 21, 1989

[54] AGGLOMERATION DEVICE

[76] Inventor: Carl A. Holley, 14315 Tall Oaks, Riverview, Mich. 48192

[21] Appl. No.: 302,613

[22] Filed: Jan. 27, 1989

[51] Int. Cl.$^4$ .............................................. B01J 2/10
[52] U.S. Cl. .................................. 425/222; 366/313
[58] Field of Search ............... 425/222, 279; 264/117; 366/313

[56] References Cited

U.S. PATENT DOCUMENTS

| | | | |
|---|---|---|---|
| 3,250,321 | 5/1966 | Root, 3rd | 366/313 |
| 3,326,642 | 6/1967 | Ruble | 425/222 |
| 3,353,208 | 11/1967 | Fergus | 425/222 |
| 4,136,975 | 1/1979 | Forseth | 425/222 |
| 4,478,515 | 10/1984 | Tobin | 366/313 |
| 4,502,858 | 3/1985 | Kertok | 425/222 |
| 4,655,701 | 4/1987 | Moriya | 366/313 |
| 4,726,755 | 2/1988 | Holley | 425/222 |

Primary Examiner—Tim Miles
Attorney, Agent, or Firm—William J. Ruano

[57] ABSTRACT

An agglomeration device having a driven shaft and a plurality of pins extending radially outwardly thereof of such length as to sweep closely to the inner surface of the casing of the device. The improvement therein is a layer of high density plastic material attached to the inner surface of the casing and the provision of a ceramic sleeve in the end portion of the pins of extremely hard material such as tungsten carbide, silicon carbide, alumina or boron carbide.

5 Claims, 1 Drawing Sheet

AGGLOMERATION DEVICE

This invention relates to an agglomeration device and, more particularly, to the pin construction and casing thereof and is an improvement of my pending application Ser. No. 07/124,090, filed Nov. 23, 1987.

BACKGROUND OF THE INVENTION on devices, in the past, have developed serious problems, such as the tendency of breakage of the radially extending pins as they rub against very dense layers of material being mixed which tend to virtually weld to the inner surface of the steel cylindrical body. Attempts have been made by building in scrappers but these have consumed considerable electrical power and have not solved the problem since once the layers are formed they are extremely difficult to scrape.

SUMMARY OF THE INVENTION

An object of the present invention is to overcome the abovementioned problems by providing an inner layer of high density resilient plastic material, such as 80–85 durometer polyurethane, and by providing a ceramic sleeve on the end portion of the radially extending pins.

DETAILED DESCRIPTION OF THE DRAWINGS

DETAILED DESCRIPTION OF THE PREFERRED EMBODIMENT

Figure 1:
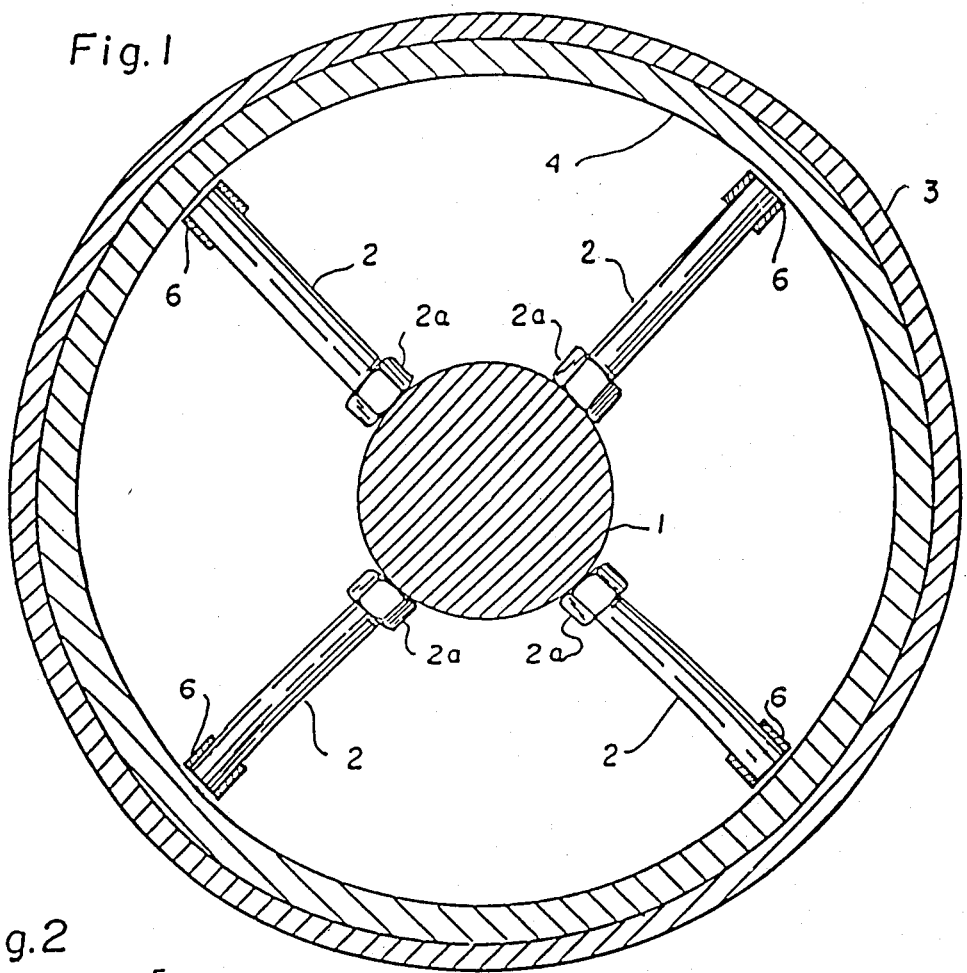
FIG. 1 shows a vertical cross-section of an agglomeration device embodying the present invention.

Referring more particularly to FIG. 1, numeral 1 denotes a rotating shaft of metal driven by any suitable motor means (not shown), which shaft has screw threadedly attached thereto pins 2 extending radially outwardly of the shaft and fastened thereto by bolts 2a.

The outer end portions of the pins 2 are provided with a ceramic sleeve 6 made of a very hard material such as alumina, tungsten carbide, silicon carbide or boron carbide. Said ceramic sleeve is flush with the end of said pin 2 and increases the diameter of the end of said pin 2 allowing greater coverage of the liner surface. For example, a ½ inch diameter pin might have a ¼ inch thick ceramic sleeve which would provide a 1 inch diameter coverage of the liner surface. The tip speed is between 3000 and 5000 feet per minute to enable pelletizing reaction to take place for certain materials.

While only 4 pins are shown in a circular path, 6 or 8 or any other number may be used instead. The pins may be of heat treated steel to at least 15,000 psig yield and a hardness of 32 to 38 Rockwell C.

An important feature of the invention is that the pins are displaced axially of the shaft 1 by the diameter of each pin so as to completely cover the inner surface area of the lining with an additional overlap relative to the thickness of the ceramic sleeve 6.

Figure 2:
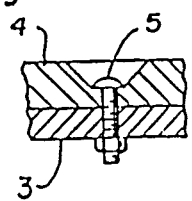
FIG. 2 is an enlarged, fragmentary cross-section showing one way of attachment of the inner lining to the casing.
Figure 3:
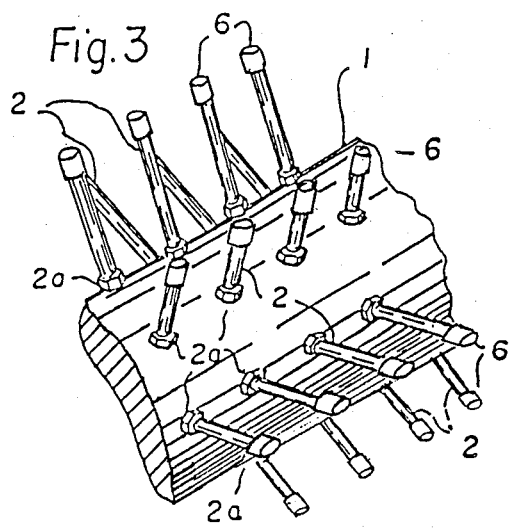
FIG. 3 shows a fragmentary, perspective view of the device shown in FIG. 1.

To the inner surface of the cylindrical steel body or casing 3 there is attached a lining 4 by any suitable means, such as that shown in FIG. 2, namely by bolts 5 extending through holes formed in the lining 4 in such manner as to not cause engagement of the bolts with the tips of pins 2, as shown in FIG. 2.

Lining 4 is made of high density resistant plastic material, such as 80–85 durometer polyurethane, which may be, instead, cast in place.

The clearance between the tips of the pins and the lining is critical and should be less than 1/16 of an inch. The lining will actually yield on the slightest accumulation of material, either on the tips of the pins or on the inner surface of lining 4. Other lining materials having characteristics similar to polyurethane may be used for example: rubber, neoprene, red rubber silicon or "viton".

Thus it will be seen that I have provided a highly efficient agglomeration device and, more particularly, the construction of the outer ends of the pins and the inner surface of the casing to minimize or prevent any tendency of breakage of the pins as the result of sticking to accumulated layers in the outer surface of the casing, also which provides a great savings in power previously used for scraping, by electrically driven mechanical means, the accumulated layers on the inner surface of the casing.

While I have illustrated and described a single specific embodiment of my invention, it will be understood that this is by way of illustration only and that various changes and modifications may be contemplated in my invention within the scope of the following claims.

I claim:

1. In an agglomeration device having a driven shaft and a plurality of pins extending radially outwardly thereof of such length as to sweep closely to the inner surface of the casing of said device; the improvement comprising a layer of high density plastic material attached to the inner surface of said casing, each pin having a ceramic sleeve.

2. The device as recited in claim 1 wherein said inner surface is a layer of 80–85 durometer polyurethane.

3. A device as recited in claim 1 wherein the ends of said pins are ensleeved with ceramic made of a material from the following group, alumina, tungsten carbide, silicon carbide or boron carbide.

4. A device as recited in claim 3 wherein said pins are in rows along said driven shaft, each row displaced axially of the shaft by the diameter of each pin.

5. A device as recited in claim 4 wherein the clearance between said layer and the tips of said pins is less than 1/16 of an inch.

* * * * *